United States Patent
Kumar et al.

(10) Patent No.: US 10,273,406 B2
(45) Date of Patent: Apr. 30, 2019

(54) SENSITIZATION OF THERMOLUMINESCENT DOSIMETER CASO4:DY BY CO-DOPING WITH MN IN PARTICULAR PROPORTION FOR MEASUREMENT OF LOW RADIATION DOSES AND THE METHOD OF PREPARATION OF CASO4:DY, MN

(71) Applicants: Indian Council of Medical Research, New Delhi (IN); All India Institute of Medical Sciences, New Delhi (IN)

(72) Inventors: Pratik Kumar, New Delhi (IN); Satya Pal Lochab, New Delhi (IN); Dinakar Kanjilal, New Delhi (IN); Shaila Bahl, New Delhi (IN)

(73) Assignees: All India Institute of Medical Sciences, New Delhi (IN); Indian Council of Medical Research, New Delhi (IN)

( * ) Notice: Subject to any disclaimer, the term of this patent is extended or adjusted under 35 U.S.C. 154(b) by 82 days.

(21) Appl. No.: 15/115,430

(22) PCT Filed: Feb. 2, 2015

(86) PCT No.: PCT/IN2015/000064
§ 371 (c)(1),
(2) Date: Jul. 29, 2016

(87) PCT Pub. No.: WO2015/114669
PCT Pub. Date: Aug. 6, 2015

(65) Prior Publication Data
US 2017/0166809 A1    Jun. 15, 2017

(30) Foreign Application Priority Data
Jan. 31, 2014 (IN) .............................. 302/DEL/2014

(51) Int. Cl.
*C09K 11/77* (2006.01)
*C09K 11/57* (2006.01)
(Continued)

(52) U.S. Cl.
CPC .......... *C09K 11/77* (2013.01); *C09K 11/7704* (2013.01); *C09K 11/7713* (2013.01); *G01T 1/2012* (2013.01); *G21K 4/00* (2013.01)

(58) Field of Classification Search
CPC .............. C09K 11/7713; C09K 11/578; C09K 11/7727; C09K 11/7741; C09K 11/7781
See application file for complete search history.

(56) References Cited

U.S. PATENT DOCUMENTS 3,883,748 A * 5/1975 Nada .................. C09K 11/7713
250/484.3

FOREIGN PATENT DOCUMENTS

| DE | 3628511 A1 | 3/1988 |
|---|---|---|
| KR | 20030065708 | * 8/2003 |
| KR | 20030065708 A | 8/2003 |

OTHER PUBLICATIONS

Yamashita, T. et al., "Calcium Sulfate Activated by Thulium or Dysprosium for Thermoluminescence Dosimetry", Health Physics Pergamon Press, Aug. 1971, pp. 295-300, vol. 21.

* cited by examiner

*Primary Examiner* — Matthew E. Hoban
(74) *Attorney, Agent, or Firm* — The Webb Law Firm

(57) ABSTRACT

This invention relates to a thermoluminescent phosphor for the measurement of low radiation doses, including calcium sulphate ($CaSO_4$), Dysprosium (Dy) and manganese (Mn), wherein Dy and Mn are present as dopants. A process for the preparation of a thermoluminescent phosphor is also provided. The process includes the steps of: separately dissolving calcium sulphate (CaSO4), Dysprosium chloride (DyCh)

(Continued)

and Manganese chloride (MnC) in hot concentrated sulphuric acid, to obtain sulphuric acid solutions of $CaSO_4$, DyCb and MnCb; mixing the solutions; and followed by slow evaporation of the solvent to obtain a powder of microcrystalline phosphor of $CaSO_4$:Dy, Mn.

13 Claims, 4 Drawing Sheets

(51) Int. Cl.
  *G21K 4/00* (2006.01)
  *G01T 1/20* (2006.01)

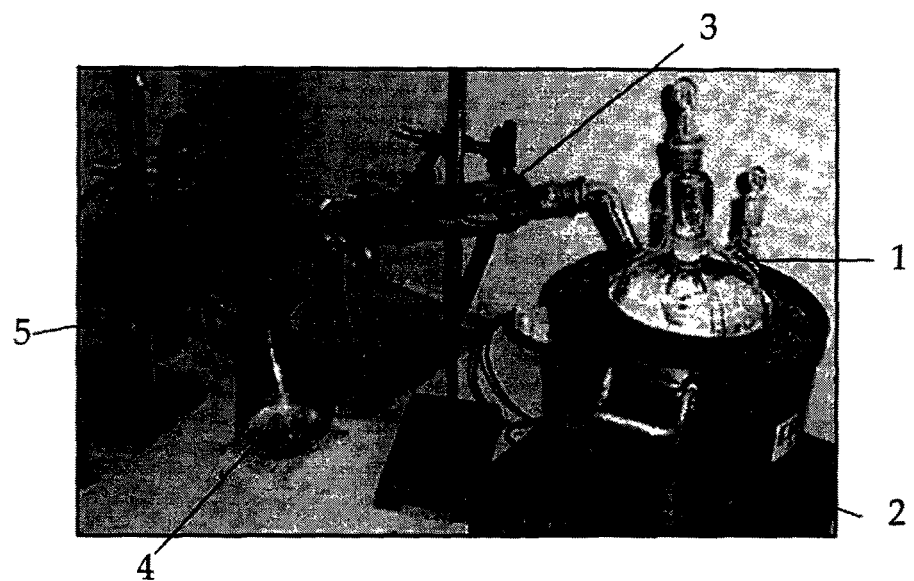
Figure : 1
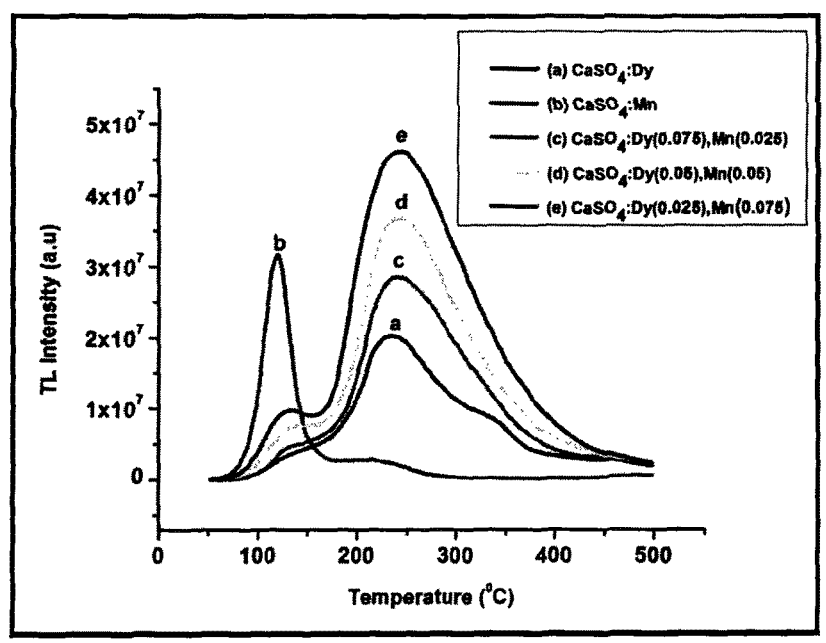
Figure : 2

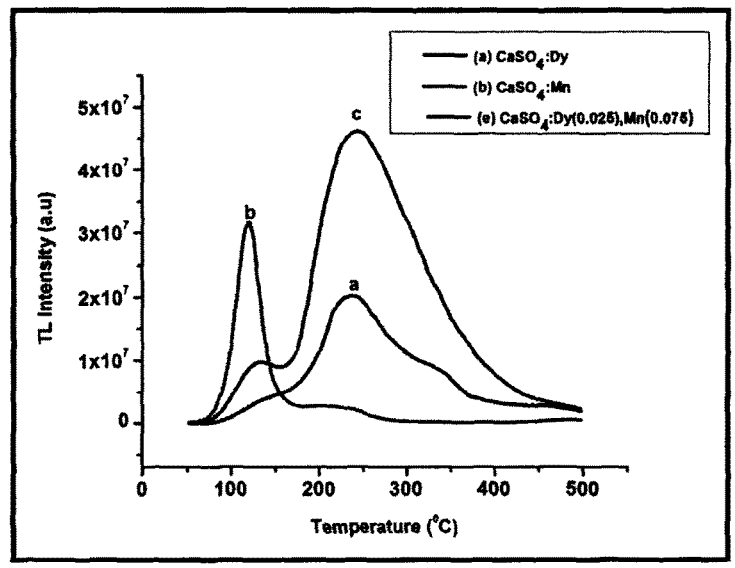
Figure : 3
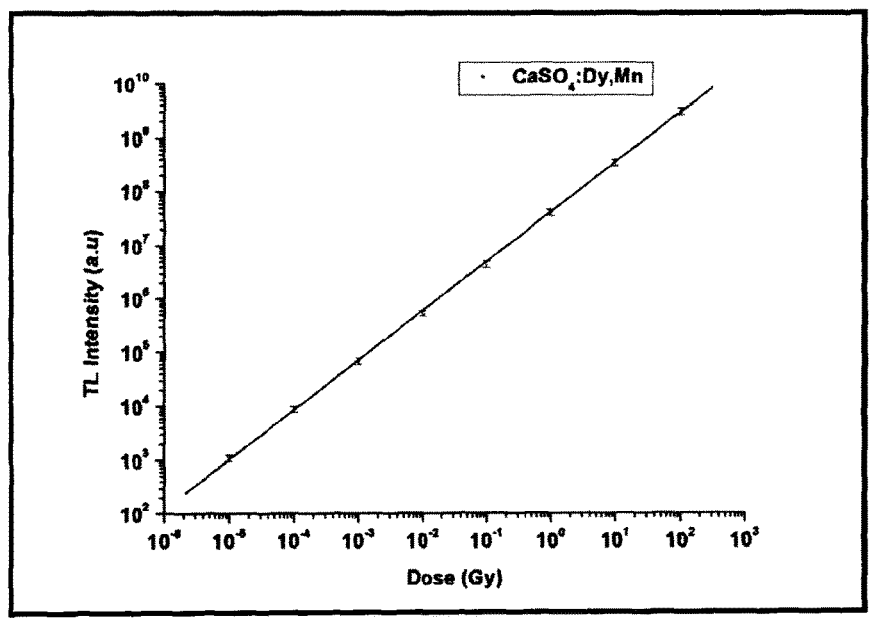
Figure : 4

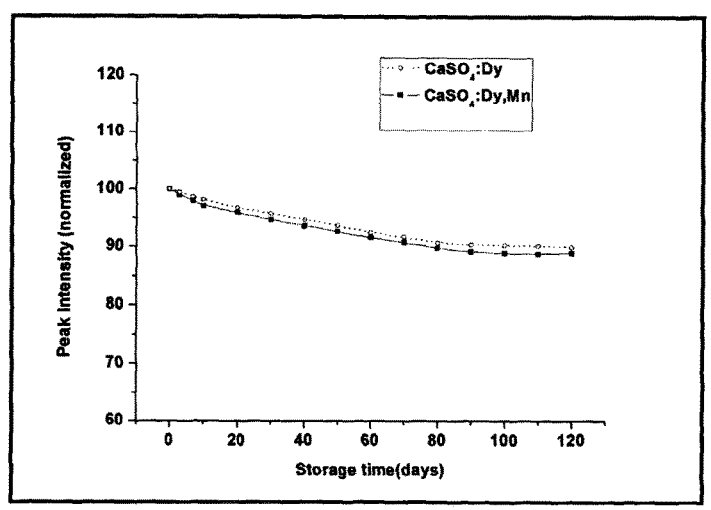
Figure : 5
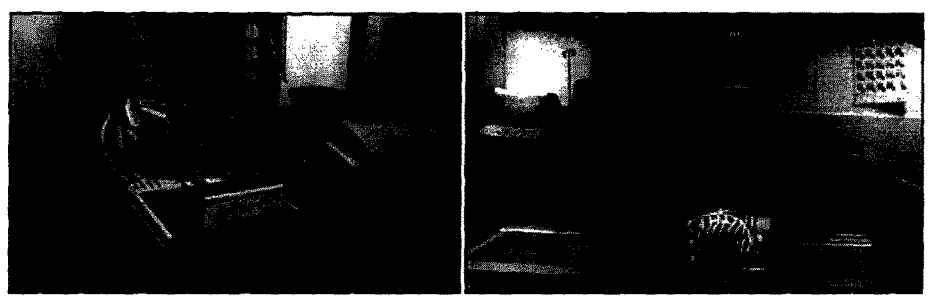
Figure : 6

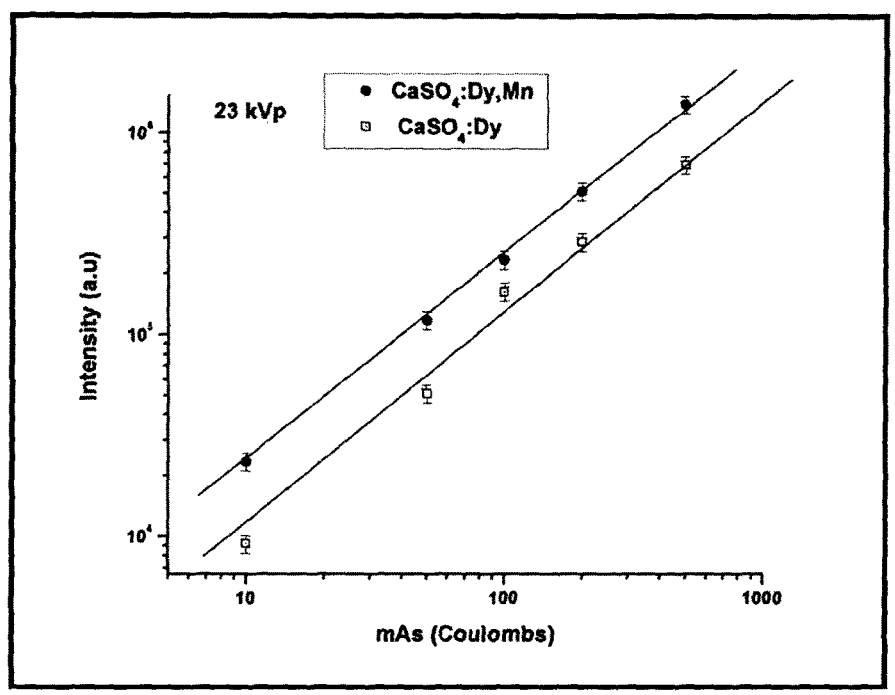
Figure : 7

SENSITIZATION OF THERMOLUMINESCENT DOSIMETER CASO4:DY BY CO-DOPING WITH MN IN PARTICULAR PROPORTION FOR MEASUREMENT OF LOW RADIATION DOSES AND THE METHOD OF PREPARATION OF CASO4:DY, MN

CROSS-REFERENCE TO RELATED APPLICATIONS

This application is the United States national phase of International Application No. PCT/IN2015/000064 filed Feb. 2, 2015, and claims priority to Indian Patent Application No. 302/DEL/2014 filed Jan. 31, 2014, the disclosures of which are hereby incorporated in their entirety by reference.

FIELD OF THE INVENTION

This invention relates to a thermoluminescent phosphor and a process for the preparation thereof.

BACKGROUND OF THE INVENTION

Ionizing radiation, such as X-rays, alpha rays, beta rays, and gamma rays, are undetectable by the human senses and therefore require a measuring device to detect, measure and record the amount of radiation. Dosimeters may measure an individual's or an object's radiation dose and also cumulative dose which is accumulated over a period of time. A thermoluminescent dosimeter (TLD) is a type of radiation dosimeter which measures ionizing radiation dose by measuring the amount of visible light emitted from a crystal in the detector when the crystal is heated after its irradiation. The amount of light emitted depends upon the amount of radiation exposure received by it. TLD is extensively used for radiation monitoring of workers engaged in radiation area and environmental radiation measurement. Calcium Sulphate ($CaSO_4$) is one of the most investigated materials which is used as TLD. It has been experimentally modified with several dopant to increase/modify its Thermoluminescent (TL) sensitivity, the Dysprosium (Dy) doping, in particularly has been the most successful in the series. $CaSO_4$:Dy is always the choice when it comes to radiation exposures for personnel monitoring. It remains one of the most attractive TLD materials because of ease preparation in large quantity with essentially the same Thermoluminescent (TL) properties and its high sensitivity. The stability of its response even in adverse climatic conditions further adds to its demand in monitoring doses in the field. The need for further enhancing the Thermally Stimulated Luminescence (TSL) sensitivity of $CaSO_4$:Dy is felt in order to cater to the dose range used in the area of radiological medical imaging, nuclear medicine, interventional fluoroscopy x-rays in medical use like urology, orthopaedics, cardiology, anaesthesiology, dental and medical radiation research use which are getting smaller and smaller with the advent of safe and smart technology. For example, radiation doses involved in medical imaging (like Radiography, Computed Tomography (CT), Fluoroscopy during angioplasty and angiography, Mammography etc.) has come down significantly as compared to the radiation doses involved in these medical imaging devices a decade ago.

Literature survey shows that the first synthetic $CaSO_4$, activated with Manganese (Mn), showed high sensitivity, but its glow curve exhibited a single peak at low temperature (90° C.). Therefore, fading of radiation dose recorded of this material was very pronounced (40-85% in the first 3 days after exposures). The credit for the development of a highly sensitive $CaSO_4$ TLD material goes to Yamashita et al. Later Nambi et al. have studied the TL properties of $CaSO_4$ phosphors doped individually by different rare earth (RE) elements and concluded that Dysprosium (Dy) and Thulium (Tm) are the most efficient activators and that the optimum concentration of the dopant is 0.1%.

With advancement in technology, the amount of radiation dose in radiation use in medicine and medical imaging has become smaller. Therefore, ultrasensitive TL dosimeters and more sensitive phosphors compared to $CaSO_4$:Dy for low doses of radiation, are the need of the hour.

OBJECTS OF THE INVENTION

It is therefore an object of this invention to propose a thermoluminescent phosphor, which is Ultrasensitive compared to known materials.

It is a further object of this invention to propose a thermoluminescent phosphor, which is easy to prepare.

Another object of this invention is to propose a thermoluminescent phosphor, which can measure low radiation doses.

Yet another object of this invention is to propose a thermoluminescent phosphor, which is cost-effective.

These and other objects of the invention will be apparent to a person skilled in the art, on reading the ensuing description, in conjunction with the accompanying drawing.

BRIEF DESCRIPTION OF THE ACCOMPANYING DIAGRAMS

FIG. 1 is a photograph of a set-up for samples preparations by recrystallisation method.

FIG. 2 is a graph showing TL glow curves for CaSO4:Dy(x), Mn(1−x) for x varing in steps of 0.025 mol % for a Gamma dose of 1 Gy. The highest TL intensity was found for glow curves for $CaSO_4$:Dy (0.025), Mn(0.075).

FIG. 3 is a graph showing TL glow curve (a) represents CaSO4:Dy(0.1 mol %), curve (b) represents $CaSO_4$:Mn(0.1 mol %) and curve (c) shows $CaSO_4$:Dy (0.025 mol %), Mn (0.075 mol %) for a Gamma radiation dose of 1 Gy.

FIG. 4 is a graph showing TL response curves of $CaSO_4$:Dy (0.025), Mn (0.075) sample subjected to gamma rays in the dose range of 10 Gy-100 Gy (10 micro Gray-100 Gray)

FIG. 5 is a graph showing fading of microcrystalline $CaSO_4$:Dy and $CaSO_4$:Dy (0.025), Mn (0.075)

FIG. 6 is a photograph of Breast Phantom with TL phosphors pasted on it being irradiated in mammography Unit (a). A Chest Phantom with TL phosphors pasted on it being irradiated in a X-Ray radiography Unit (b).

FIG. 7 is a graph of a TL Response for new $CaSO_4$:Dy, Mn and $CaSO_4$:Dy in mammography. The radiation dose was varied by charging x ray tube current (mA) and exposure time(s).

DETAILED DESCRIPTION OF THE INVENTION

Thus, according to this invention is provided a thermoluminescent phosphor and a process for the preparation thereof.

In accordance with this invention, the thermoluminescent phosphor is $CaSO_4$: Dy,Mn. The procedure of preparation of $CaSO_4$ involves the standard production route known which is based on the recrystallization method as proposed by Yamashita et al [T. Yamashita, N. Nada, H. Onishi and S. Kitamura, Calcium sulphate activated by thulium or dysprosium for thermoluminescence dosimetry, Health Phys. 21 (1971) 295.]. However, the difference between the method adopted by Yamashita et al. and the process according to the instant invention lies in the activator compounds i.e. chloride form of Dysprosium (in the form of $DyCl_3$) was used by us unlike oxide salt of Dysprosium ($Dy_2O_3$) used by Yamashita. Moreover, the inventors have further added Manganese (in the form of $MnCl_2$) as a co-dopant to produce $CaSO_4$:Dy,Mn to increase its sensitivity, and they have carried out thorough evaluation of this new material $CaSO_4$:Dy,Mn prepared by them. All the samples of $CaSO_4$:Dy,Mn were prepared dissolving Analytical Reagent (AR) grade $CaSO_4$ matrix and the dopants in desired ratios and quantities in hot concentrated sulphuric acid, and mixing the solutions, followed by slow evaporation of the solvent therefrom using a temperature controlled electric heater in a well-closed system to avoid escape of the acid vapours to the atmosphere. The apparatus used in this method is shown in FIG. 1. The solution is heated in a four-necked flask (1) seated in a heating mantle (2). The main neck and two other necks are closed and the remaining neck is connected to a flask (4), through a condensation (3). This flask (4) is the acid condensing flask (4). The acid vapours are sucked through an air flux created by suction pump, and collected in the flask (5). The powder thus obtained in the closed system is the required microcrystalline phosphor of $CaSO_4$:Dy,Mn. The sample is washed several times with water to remove any traces of residual acid.

Results of the Optimisation Experiments (a) Preparation of Control $CaSO_4$: Dy

First of all $CaSO_4$:Dy was prepared by adding $DyCl_3$ (which is at variance with the method of Yamashita et. al to $CaSO_4$). Several samples of $CaSO_4$:Dy for different concentrations of dysprosium varying from 0.05 to 0.3 mol % were prepared and the TL glow curves were recorded. It was found that the optimized concentration of Dy in $CaSO_4$:Dy came out to be 0.1 mol %. A plot of the TL intensity as a function of Dysprosium concentration in $CaSO_4$ after a gamma radiation dose of 1 Gray (Gy) clearly shows that the highest signal intensity for same radiation dose is for 0.1 mol % of Dysprosium in $CaSO_4$:Dy.

The optimized concentration of 0.1 mol % of Dy was kept constant for preparation of other samples. In this way the $CaSO_4$:Dy (in 0.1 mol %) was prepared so that it may serve as control.

(b) Preparation of Control $CaSO_4$: Mn

Next $CaSO_4$:Mn was prepared by doping host $CaSO_4$ with Manganese (Mn) in the form of $MnCl_2$ by the same method of preparation keeping the Mn concentration to be 0.1 mol %. $CaSO_4$:Mn was prepared as control phosphor in order to carry out comparison studies with new phosphor $CaSO_4$:Dy,Mn and another control phosphor $CaSO_4$:Dy.

(c) Synthesis of new TL phosphor $CaSO_4$:Dy,Mn by optimising Dy and Mn ratio

A new TL phosphor $CaSO_4$:Dy,Mn was prepared by adding Dy in the form of $DyCl_3$ and Mn in the form of $MnCl_2$ into the host compound $CaSO_4$. The molar concentration of the dopants Dy and Mn were varied and it was that the concentration affects the sensitivity of the phosphor. For arriving at the maximum TL read out signal from new TL material $CaSO_4$:Dy,Mn the ratio of Dy and Mn was varied as $CaSO_4$:Dy (x),Mn (1−x) where x varies from 0 to 1 in steps of 0.025 mol %, total quantity of dopants being 0.1 mol %. FIG. 2 shows the TL glow curves of the sample with variation in Dy and Mn doping for radiation dose of 1 Gy. It is observed that the TL intensity increases with the increase in the Mn concentration. The maximum TL intensity was received in the $CaSO_4$:Dy(0.025),Mn(0.075) combination.

Table 1 shows the effect on TL intensity with variation in the dopant concentration of Dy and Mn.

TABLE 1

Variation of TL intensity with variation in relative ratio of dopants Dy and Mn in $CaSO_4$. The maximum intensity was found to be for $CaSO_4$:Dy (0.025), Mn(0.075)

| $CaSO_4$:Dy(x),Mn(1 − x) (x = 0-1 in steps of 0.025) | Dy | Mn | TL Intensity (a.u) (peak height) |
|---|---|---|---|
| $CaSO_4$:Dy | 1 | 0 | 2.06 × 10 |
| $CaSO_4$:Dy(0.025),Mn(0.075) | 0.025 | 0.075 | 4.61 × 10$^7$ |
| $CaSO_4$:Dy(0.050),Mn(0.050) | 0.050 | 0.050 | 3.62 × 10$^7$ |
| $CaSO_4$:Dy(0.075),Mn(0.025) | 0.075 | 0.025 | 2.85 × 10$^7$ |
| $CaSO_4$:Mn | 0 | 1 | 3.18 × 10$^7$ |

The invention will now be explained in greater details with the help of the following non-limiting example.

EXAMPLE 8.60 g of $CaSO_4.2H_2O$ was taken in conc $H_2SO_4$ (around 50 ml), and a solution was prepared. 0.075 mol % of $MnCl_2.4H_2O$ (~0.0074 g) and 0.025 mol % of $DyCl_2.6H_2O$ (~0.0047 g) in powder form were added to the above solution and mixed in a 4-necked round bottomed flask and was heated on a heating mantle. The set-up used for the reaction is shown in FIG. 1. The temperature was maintained at around 350° C., and the solvent was allowed to evaporate, which was sucked into a conical flask connected to the RB flask through a condenser and a suction pump. As the sulphuric acid was distilled off, a crystalline powder was left in the RB flask. This was the microcrystalline $CaSO_4$:Dy (0.025), Mn(0.075) which was washed several times with water to remove any trace of residual acid.

In conclusion, three samples were prepared: control $CaSO_4$:Dy(0.1 mol %), another control $CaSO_4$:Mn(0.1 mol %) and the new phosphor $CaSO_4$:Dy(0.025 mol %), Mn(0.075 mol %). All three were subjected to a gamma radiation dose of 1 Gray (Gy) from a Cesium-137 ($^{137}$Cs) radioactive source. FIG. 3 shows the comparative TL glow curves for the three samples shows that the new material $CaSO_4$:Dy,Mn gives about twice TL intensity 4.61×10$^7$ arbitrary unit (a.u.) than standard $CaSO_4$:Dy (curve "a" in FIG. 3) which is giving TL intensity 2.06×10$^7$ a.u. Another control $CaSO_4$:Mn has the peak at low temperature at around 110° C. and hence prone to show pronounced fading of TL intensity with time (literature reports 40-85% fading in 3 days). The new phosphor $CaSO_4$:Dy,Mn has peak at around 240° C. and hence has much low fading of 11% in 3 months.

(d) TL Response of new $CaSO_4$:Dy,Mn

Since the sample $CaSO_4$:Dy(0.025),Mn(0.075) showed a good TL intensity, it was further tested for its dose response with different doses of gamma irradiation. The sample was irradiated in a radiation dose range of 10 microGray (μGy) to 100 Gray (Gy). The TL response curves of $CaSO_4$:Dy (0.025),Mn(0.075) samples irradiated by gamma rays are shown in FIG. 4. The response curve of the material irradiated by gamma rays with a dose range of 10 μGy to 100 Gy shows linearity in the full range. Linearity over a wide range and the ability to measure doses in the range of microgray makes this material ideal for personnel and environmental dosimetry. Experiments have shown that this new material can measure radiation dose as low as 10 microGray. This new material can be used to measure therapeutic doses (which is 2 Gy) as well since it maintains its linearity even in the range of Grays. Therefore, we conclude that this new TL material is equally sensitive from very low dose of microgray to large dose in Gray. It is noteworthy that 1 Gy=1000000 µGy.

e) Fading Study

The TL fading curve of $CaSO_4:Dy(0.25),Mn(0.75)$ and the standard (control) phosphor $CaSO_4:Dy$ was also recorded and is shown in FIG. 5. Both the samples were irradiated with a radiation dose of 1 Gy and stored in a simple vial without taking any precautions to shield it from light and humidity and the glow curves were recorded at various intervals for a period of around 90 days. The variation in the peak intensity over the storage time gives the amount of fading in the sample. Fading of about 10% in $CaSO_4:Dy$ while the fading in our new phosphor $CaSO_4:Dy(0.25),Mn(0.75)$ was observed to be 11%.

The new thermoluminescence material $CaSO_4:Dy(0.25),Mn(0.75)$ is a very sensitive TL material which can measure small radiation accurately since it is about twice sensitive than the $CaSO_4:Dy$. The new material is also capable of measuring large radiation doses since its response to radiation in linear in a very wide range. With the advancement of technology in medical imaging equipment (like digital radiography, computed radiography, computed tomography, digital mammography, DEXA etc.) the radiation exposure in imaging is getting smaller. The new TL material $CaSO_4:Dy$, Mn being very sensitive can be used to measure the smaller radiation doses. Application of new Phosphor $CaSO_4:Dy$, Mn.

To confirm the capability of new $CaSO_4:Dy$, Mn to measure smaller radiation dose, this new TL compound was irradiated along with control; $CaSO_4:Dy$ in a mammography machine (FIG. 6*a*) and a radiography machine (FIG. 6*b*) pasted on human stimulation phantoms.

Comparative Studies of the use of new $CaSO_4:Dy,Mn$ with Standard Phosphor in Mammography Mammography uses low-energy X-rays to image the human breast and is used as a diagnostic and a screening tool for detection of breast cancer tumor. The goal of mammography is the early detection of breast cancer typically through detection of characteristic masses and/or microcalifications. Mammograms use low doses of ionizing radiations to create images which are then analyzed by the Radiologists for any abnormal Findings. The examination is performed by selecting parameters such as kVp (peak kilo voltage) and mAs (milli Ampere second) which is applied to x-ray tube for generation of x-rays from x-ray tube. The selection of kVp and mAs determines the energy and quantity of x-ray photons. Therefore, kVp and mAs are selected on the basis of the breast thickness and density of the patient. For the mammography study $CaSO_4:Dy(0.25),Mn(0.75)$ and the standard (control) sample $CaSO_4:Dy$ were irradiated with 23 kVp x-rays with mAs varying in the range of 10 to 500 by a mammography X-ray unit manufactured by Philips Mammo Dignost using a breast simulator called mammography phantom. The radiation doses were varied by controlling the imaging machine parameters to obtain full range of radiation doses. It was seen that new $CaSO_4:Dy$, Mn showed linear response to dose in whole dose range while the control $CaSO_4:Dy$ could not maintain the linear response at low doses (FIG. 7). A plot of the variation of TL response curves (peak intensity) of both the samples with x-ray quantity (controlled by milliampere second) in mammography, shows that the sample $CaSO_4:Dy$ was sublinear below 100 mAs unlike the newly prepared sample $CaSO_4:Dy(0.25),Mn(0.75)$ which showed linearity in the full dose range. This significant feature of linearity along with good intensity in low dose ranges shown by our sample makes it in close proximity of an ideal phosphor.

This new TL material (phosphor) $CaSO_4:Dy(0.25),Mn(0.75)$ which has optimised Dy and Mn ratio exhibits improved TL properties and an increased TL intensity by a factor of approximately two over the existing standard $CaSO_4:Dy$ and overcomes the major disadvantage of high fading of $CaSO_4:Mn$ (due to low temperature peak of $CaSO_4:Mn$). The standard (control) microcrystalline $CaSO_4:Dy$ phosphor (better known as TLD 900) is a sensitive phosphor but the sensitivity of the phosphor $CaSO_4:Dy(0.25),Mn(0.75)$ according to the invention is even better. Most of the phosphors known today show sublinear response at low doses and this poses a problem in estimating the low radiation doses. Since radiation doses in any amount entails certain risk, its dosimetry is important.

$CaSO_4:Dy(0.25),Mn(0.75)$ material could be a good candidate for low doses as it has a good sensitivity at low doses and is linear to a wide range of radiation exposures. Also, the fading of $CaSO_4:Dy(0.25),Mn(0.75)$ is similar to that of $CaSO_4:Dy$ estimated over a period of three months. All these confirm that the new phosphor $CaSO_4:Dy(0.25),Mn(0.75)$ is more suitable for radiation dosimetry than standard $CaSO_4:Dy$ material.

We claim:

1. A process for preparation of a thermoluminescent phosphor, comprising:
    dissolving calcium sulphate ($CaSO_4$), Dysprosium chloride ($DyCl_3$) and Manganese chloride ($MnCl_2$) separately in hot concentrated sulphuric acid to obtain sulphuric acid solutions of $CaSO_4$, $DyCl_3$, and $MnCl_2$,
    mixing the sulphuric acid solutions of $CaSO_4$, $DyCl_3$, and $MnCl_2$, and
    slowly evaporating a solvent of a mixture of the sulphuric acid solutions to obtain a powder of a microcrystalline phosphor comprising $CaSO_4:Dy$, Mn.

2. The process as claimed in claim 1, wherein slowly evaporating the solvent comprises heating the mixture of the sulphuric acid solutions of $CaSO_4$, $DyCl_3$, and $MnCl_2$ at 350° C. in a closed system.

3. The process as claimed in claim 1, wherein the $CaSO_4:Dy$, Mn comprises $CaSO_4:Dy(x), Mn(1-x)$, where x is from 0 to 1 mol %.

4. The process as claimed in claim 1, wherein the $CaSO_4:Dy$, Mn has a concentration of Dy of from 0 to 1 mol %, and wherein the Dy is dissolved in the sulphuric acid in steps of 0.025 mol %.

5. The process as claimed in claim 1, wherein the $CaSO_4:Dy$, Mn has a concentration of Mn of from 0 to 1 mol %, and wherein the Mn is dissolved in the sulphuric acid in steps of 0.025 mol %.

6. The process as claimed in claim 1, wherein the $CaSO_4:Dy$, Mn has a concentration of Dy of 0.025 mol % and a concentration of Mn of 0.075 mol %.

7. The process as claimed in claim 1, wherein the microcrystalline phosphor is capable of being used in measuring low radiation doses involved in one or more of radiological medical imaging, nuclear medicine, and interventional fluoroscopy x-rays, for medical uses.

8. The process as claimed in claim 1, wherein the microcrystalline phosphor is capable of being used in medical imaging.

9. The process as claimed in claim 8, wherein the medical imaging comprises one or more of Radiography, Computed Tomography (CT), Fluoroscopy during angioplasty and angiography, and Mammography.

10. The process as claimed in claim 7, wherein the medical use is one or more of urology, orthopaedics, cardiology, anaesthesiology, and/or dental and medical radiation research use.

11. The process as claimed in claim 1, wherein a thermoluminescent intensity of the microcrystalline phosphor is at least $3.62\times10^7$ counts (a.u.) compared to standard $CaSO_4$:Dy having a thermoluminescent intensity of $2.06\times10^7$ counts (a.u.).

12. The process as claimed in claim 1, wherein a thermoluminescent intensity of the microcrystalline phosphor is at least $4.61\times10^7$ counts (a.u.) compared to standard $CaSO_4$:Dy having a thermoluminescent intensity of $2.06\times10^7$ counts (a.u.).

13. The process as claimed in claim 1, wherein a thermoluminescent intensity of the microcrystalline phosphor is from $3.62\times10^7$ to $4.61\times10^7$ counts (a.u.) compared to standard $CaSO_4$:Dy having a thermoluminescent intensity of $2.06\times10^7$ counts (a.u.).

\* \* \* \* \*